(12) United States Patent
Lindh et al.

(10) Patent No.: US 8,711,790 B2
(45) Date of Patent: Apr. 29, 2014

(54) DL CONTROL CHANNEL STRUCTURE ENHANCEMENT

(75) Inventors: Lars E. Lindh, Helsinki (FI); Klaus Hugl, Helsinki (FI); Cássio Barboza Ribeiro, Espoo (FI)

(73) Assignee: Nokia Corporation, Espoo (FI)

( * ) Notice: Subject to any disclaimer, the term of this patent is extended or adjusted under 35 U.S.C. 154(b) by 155 days.

(21) Appl. No.: 12/931,858

(22) Filed: Feb. 11, 2011

(65) Prior Publication Data

US 2012/0207099 A1 Aug. 16, 2012

(51) Int. Cl.
*H04W 72/04* (2009.01)

(52) U.S. Cl.
USPC ............................. 370/329; 370/338; 370/310

(58) Field of Classification Search
USPC .................................................. 370/328, 401
See application file for complete search history.

(56) References Cited

U.S. PATENT DOCUMENTS

| | | | |
|---|---|---|---|
| 7,852,813 B2 | 12/2010 | Suh et al. | 370/335 |
| 2007/0060091 A1 | 3/2007 | Kim et al. | 455/266 |
| 2010/0034303 A1 | 2/2010 | Damnjanovic et al. | 375/260 |
| 2010/0254268 A1* | 10/2010 | Kim et al. | 370/241 |
| 2010/0279628 A1 | 11/2010 | Love et al. | 455/70 |
| 2010/0291934 A1 | 11/2010 | Lopes | 455/446 |
| 2010/0331030 A1 | 12/2010 | Nory et al. | 455/509 |
| 2011/0044391 A1 | 2/2011 | Ji et al. | 375/260 |
| 2011/0081913 A1 | 4/2011 | Lee et al. | 455/450 |
| 2011/0110296 A1* | 5/2011 | Malladi et al. | 370/328 |
| 2011/0170496 A1* | 7/2011 | Fong et al. | 370/329 |
| 2011/0249633 A1 | 10/2011 | Hong et al. | 370/329 |
| 2011/0274066 A1* | 11/2011 | Tee et al. | 370/329 |
| 2011/0280223 A1 | 11/2011 | Maeda et al. | 370/335 |
| 2011/0292891 A1 | 12/2011 | Hsieh et al. | 370/329 |
| 2013/0114517 A1 | 5/2013 | Blankenship et al. | 370/329 |

FOREIGN PATENT DOCUMENTS

| | | |
|---|---|---|
| EP | 2306782 A1 | 4/2011 |
| WO | WO-2004/102839 A1 | 11/2004 |
| WO | WO-2011/019232 A2 | 2/2011 |
| WO | WO-2010/053984 A2 | 5/2012 |
| WO | WO-2010-124721 A1 | 11/2012 |

OTHER PUBLICATIONS

"Radio Resource Management", Harri Holma, et al., LTE for UMTS:OFDMA and SC-FDMA Based radio Access, 2009, pp. 181-212.

"Support of Precoding for E-UTRA DL L1/L2 Control Channel", Motorola, 3GPP TSG RAN1 #50, R1-073370, Aug. 2007, 4 pgs.

(Continued)

*Primary Examiner* — Dang Ton
*Assistant Examiner* — Pamit Kaur
(74) *Attorney, Agent, or Firm* — Harrington & Smith (57) ABSTRACT

An apparatus includes one or more processor and one or more memories including computer program code. The one or more memories and the computer program code are configured to, with the one or more processors and in response to execution of the computer program code, cause the apparatus to perform at least the following: accessing in an enhanced downlink control region of a downlink subframe a downlink control channel message corresponding to the apparatus, wherein the downlink control channel message corresponding to the apparatus occupies two or more physical resource blocks contiguous in one or both of time and frequency; and accessing or not accessing a portion specific to the apparatus of a physical downlink shared channel in the downlink subframe, depending in least in part on the determined downlink control channel message. Additional apparatus, methods, and computer products are disclosed.

15 Claims, 8 Drawing Sheets

(56) References Cited

OTHER PUBLICATIONS

"3$^{rd}$ Generation Partnership Project; Technical Specification Group Radio Access Network; Evolved Universal Terrestrial Radio Access (E-UTRA); Physical channels and modulation (Release 10)", 3GPP TS 36.211 V10.0.0, Dec. 2010, 103 pgs.

"3$^{rd}$ Generation Partnership Project; Technical Specification Group Radio Access Network; Evolved Universal Terrestrial Radio Access (E-UTRA); Multiplexing and channel coding (Release 10)", 3GPP TS 36.212 V10.0.0, Dec. 2010, 72 pgs.

"3$^{rd}$ Generation Partnership Project; Technical Specification Group Radio Access Network; Evolved Universal Terrestrial Radio Access (E-UTRA); Physical layer procedures (Release 10)", 3GPP TS 36.213 V10.0.0, Dec. 2010, 98 pgs.

"3$^{rd}$ Generation Partnership Project; Technical Specification Group Radio Access Network; Evolved Universal Terrestrial Radio Access (E-UTRA); Physical layer procedures (Release 10)", 3GPP TS 36.213 V10.0.1, Dec. 2010, 98 pgs.

"Pre-Coding for Downlink Control Channel", Lars E. Lindh et al., International Application No. PCT/IB2008/054885, filed Nov. 22, 2008, 40 pgs.

International Search Report and Written Opinion for corresponding International Patent Application PCT/FI2012/050022 filed Jan. 12, 2012, mailed Apr. 4, 2012.

* cited by examiner

DL CONTROL CHANNEL STRUCTURE ENHANCEMENT

TECHNICAL FIELD

This invention relates generally to radio frequency (RF) reception and transmission and, more specifically, relates to downlink control channel structures.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

| | |
|---|---|
| 3GPP | third generation partnership project |
| ACK | acknowledge (positive acknowledge) |
| ARQ | automatic repeat request |
| BTS | base transceiver system |
| C-RNTI | cell-radio network temporary identifier |
| CSI | channel state information |
| DL | downlink (eNB, Node B towards UE) |
| eNB | EUTRAN Node B (evolved Node B, or eNodeB) |
| EUTRAN | evolved UTRAN (LTE) |
| GGSN | gateway general packet radio system support node |
| LTE | long term evolution |
| MAC | medium access control |
| MIMO | multiple input, multiple output |
| MM/MME | mobility management/mobility management entity |
| MU-MIMO | multi-user MIMO |
| NACK | not acknowledge/negative acknowledge |
| NBAP | Node B application part (signaling) |
| Node B | base station (includes BTS) |
| OFDMA | orthogonal frequency division multiple access |
| O&M | operations and maintenance |
| PCFICH | physical control format indicator channel |
| PDCCH | physical downlink control channel |
| PDSCH | physical downlink shared channel |
| PHICH | physical hybrid ARQ indicator channel |
| PRB | physical resource block |
| P-RNTI | paging-radio network temporary identifier |
| PUCCH | physical uplink control channel |
| PUSCH | physical uplink shared channel |
| RACH | random access channel |
| RAN | radio access network |
| RA-RNTI | random access-radio network temporary identifier |
| RB | resource block |
| RE | resource element |
| REG | resource element group |
| RF | radio frequency |
| RLC | radio link control |
| RNC | radio network controller |
| RRC | radio resource control |
| SC-FDMA | single carrier, frequency division multiple access |
| SI-RNTI | system information-radio network temporary identifier |
| SPS-RNTI | semi-persistent scheduling-radio network temporary identifier |
| SS | search space |
| TCP | transmission control protocol |
| UE | user equipment |
| UL | uplink (UE towards eNB, Node B) |
| UTRAN | universal terrestrial radio access network |

One modern communication system is known as evolved UTRAN (E-UTRAN, also referred to as UTRAN-LTE or as E-UTRA). In this system the DL access technique is OFDMA, and the UL access technique is SC-FDMA.

One specification of interest is 3GPP TS 36.300, V8.11.0 (2009 December), 3rd Generation Partnership Project; Technical Specification Group Radio Access Network; Evolved Universal Terrestrial Radio Access (E-UTRA) and Evolved Universal Terrestrial Access Network (EUTRAN); Overall description; Stage 2 (Release 8), incorporated by reference herein in its entirety. This system may be referred to for convenience as LTE Rel-8. In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published including 3GPP TS 36.300, V9.3.0 (2010 March).

Figure 1:
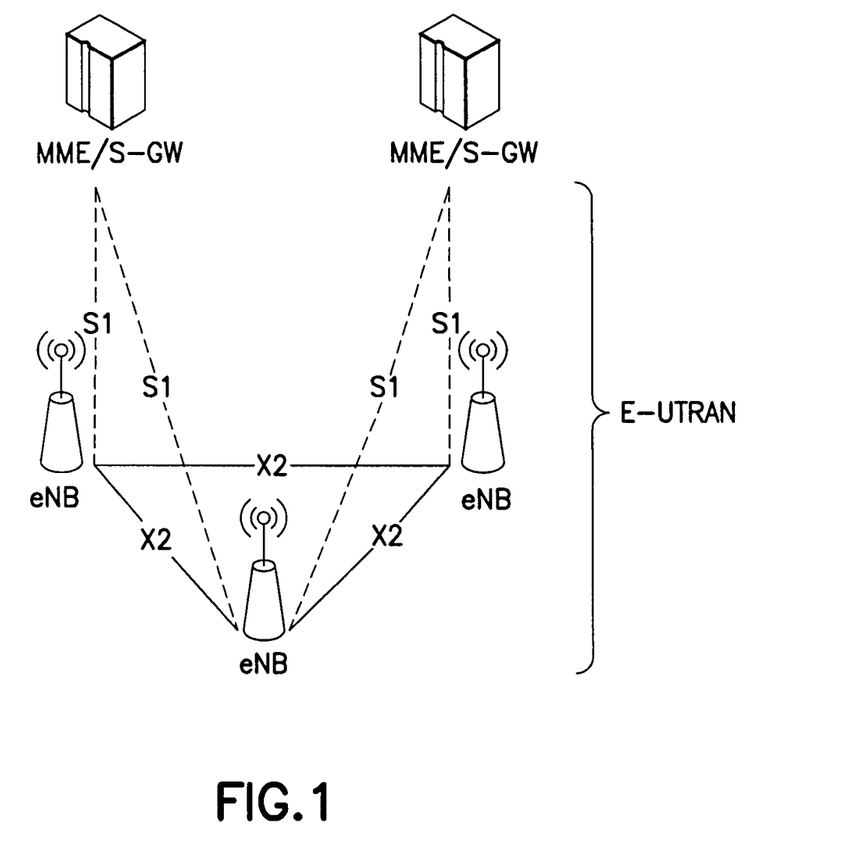
FIG. 1 reproduces Figure 4-1 of 3GPP TS 36.300, and shows the overall architecture of the EUTRAN system.

FIG. 1 reproduces Figure 4.1 of 3GPP TS 36.300 V8.11.0, and shows the overall architecture of the EUTRAN system (Rel-8). The E-UTRAN system includes eNBs, providing the E-UTRAN user plane (PDCP/RLC/MAC/PHY) and control plane (RRC) protocol terminations towards the UEs. The eNBs are interconnected with each other by means of an X2 interface. The eNBs are also connected by means of an S1 interface to an EPC, more specifically to a MME by means of a S1 MME interface and to a S-GW by means of a S1 interface (MME/S-GW 4). The S1 interface supports a many-to-many relationship between MMEs/S-GWs/UPEs and eNBs.

The eNB hosts the following functions:

functions for RRM: RRC, Radio Admission Control, Connection Mobility Control, Dynamic allocation of resources to UEs in both UL and DL (scheduling);

IP header compression and encryption of the user data stream;

selection of a MME at UE attachment;

routing of User Plane data towards the EPC (MME/S-GW);

scheduling and transmission of paging messages (originated from the MME);

scheduling and transmission of broadcast information (originated from the MME or O&M); and a measurement and measurement reporting configuration for mobility and scheduling.

Of particular interest herein are the further releases of 3GPP LTE (e.g., LTE Rel-10) targeted towards future IMT-A systems, referred to herein for convenience simply as LTE-Advanced (LTE-A). Reference in this regard may be made to 3GPP TR 36.913 V9.0.0 (2009 December) Technical Report 3rd Generation Partnership Project; Technical Specification Group Radio Access Network; Requirements for further advancements for Evolved Universal Terrestrial Radio Access (E-UTRA) (LTE-Advanced) (Release 9). Reference can also be made to 3GPP TR 36.912 V9.3.0 (2010-06) Technical Report 3rd Generation Partnership Project; Technical Specification Group Radio Access Network; Feasibility study for Further Advancements for E-UTRA (LTE-Advanced) (Release 9).

A goal of LTE-A is to provide significantly enhanced services by means of higher data rates and lower latency with reduced cost. While LTE-A has provided many such services, the services could still be improved.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein.

SUMMARY

In an exemplary embodiment, an apparatus includes one or more processor and one or more memories including computer program code. The one or more memories and the computer program code are configured to, with the one or more processors and in response to execution of the computer program code, cause the apparatus to perform at least the following: accessing in an enhanced downlink control region of a downlink subframe a downlink control channel message corresponding to the apparatus, wherein the downlink control channel message corresponding to the apparatus occupies two or more physical resource blocks contiguous in one or both of time and frequency; and accessing or not accessing a portion specific to the apparatus of a physical downlink shared channel in the downlink subframe, depending in least in part on the determined downlink control channel message.

In a further exemplary embodiment, a method includes the following: accessing in an enhanced downlink control region of a downlink subframe a downlink control channel message corresponding to an apparatus, wherein the downlink control channel message corresponding to the apparatus occupies two or more physical resource blocks contiguous in one or both of time and frequency; and accessing or not accessing a portion specific to the apparatus of a physical downlink shared channel in the downlink subframe, depending in least in part on the determined downlink control channel message.

In an additional exemplary embodiment, a computer program product is disclosed that comprises a computer-readable memory medium bearing computer program code embodied therein for use with a computer, the computer program code comprising: code for accessing in an enhanced downlink control region of a downlink subframe a downlink control channel message corresponding to an apparatus, wherein the downlink control channel message corresponding, to the apparatus occupies two or more physical resource blocks contiguous in one or both of time and frequency; and code for accessing or not accessing a portion specific to the apparatus of a physical downlink shared channel in the downlink subframe, depending in least in part on the determined downlink control channel message.

In another exemplary embodiment, an apparatus includes one or more processor and one or more memories including computer program code. The one or more memories and the computer program code are configured to, with the one or more processors and in response to execution of the computer program code, cause the apparatus to perform at least the following: receiving signaling indicating whether the apparatus is to access one or both of a first downlink control region in a downlink subframe or an enhanced downlink control region in the downlink subframe, wherein the downlink subframe has a downlink transmission bandwidth and a time duration; accessing in the first downlink control region a common downlink control channel message; in response to the received signaling indicating the apparatus is to access the first downlink control region, accessing in the first downlink control region a downlink control channel message corresponding to the apparatus and comprising quadruplets of contiguous subcarriers spread over a plurality of physical resource blocks spread over the whole downlink transmission bandwidth for the first downlink control region, each quadruplet occupying a portion but not all of a physical resource block, and depending on the downlink control channel message accessing or not accessing a portion specific to the apparatus of a first physical downlink shared channel in the downlink subframe; and in response to the received signaling indicating the apparatus is to access the enhanced downlink control region, accessing in the enhanced downlink control region a downlink control channel message corresponding to the apparatus and comprising a plurality of subcarriers occupying one or more physical resource blocks contiguous in one or both of time or frequency, and depending on the determined downlink control channel message, accessing or not accessing a portion specific to the apparatus of a second physical downlink shared channel in the downlink subframe.

In an additional exemplary embodiment, a method includes the following: receiving signaling indicating whether an apparatus is to access one or both of a first downlink control region in a downlink subframe or an enhanced downlink control region in the downlink subframe, wherein the downlink subframe has a downlink transmission bandwidth and a time duration; accessing in the first downlink control region a common downlink control channel message; in response to the received signaling indicating the apparatus is to access the first downlink control region, accessing in the first downlink control region a downlink control channel message corresponding to the apparatus and comprising quadruplets of contiguous subcarriers spread over a plurality of physical resource blocks spread over the whole downlink transmission bandwidth for the first downlink control region, each quadruplet occupying a portion but not all of a physical resource block, and depending on the downlink control channel message accessing or not accessing a portion specific to the apparatus of a first physical downlink shared channel in the downlink subframe; and in response to the received signaling indicating the apparatus is to access the enhanced downlink control region, accessing in the enhanced downlink control region a downlink control channel message corresponding to the apparatus and comprising a plurality of subcarriers occupying one or more physical resource blocks contiguous in one or both of time or frequency, and depending on the determined downlink control channel message, accessing or not accessing a portion specific to the apparatus of a second physical downlink shared channel in the downlink subframe.

In yet another embodiment, a computer program product is disclosed that comprises a computer-readable memory medium bearing computer program code embodied therein for use with a computer, the computer program code comprising: code for receiving signaling indicating whether an apparatus is to access one or both of a first downlink control region in a downlink subframe or an enhanced downlink control region in the downlink subframe, wherein the downlink subframe has a downlink transmission bandwidth and a time duration; code for accessing in the first downlink control region a common downlink control channel message; code for, in response to the received signaling indicating the apparatus is to access the first downlink control region, accessing in the first downlink control region a downlink control channel message corresponding to the apparatus and comprising quadruplets of contiguous subcarriers spread over a plurality of physical resource blocks spread over the whole downlink transmission bandwidth for the first downlink control region, each quadruplet occupying a portion but not all of a physical resource block, and depending on the downlink control channel message accessing or not accessing a portion specific to the apparatus of a first physical downlink shared channel in the downlink subframe; and code for, in response to the received signaling indicating the apparatus is to access the enhanced downlink control region, accessing in the enhanced downlink control region a downlink control channel message corresponding to the apparatus and comprising a plurality of subcarriers occupying one or more physical resource blocks contiguous in one or both of time or frequency, and depending on the determined downlink control channel message, accessing or not accessing a portion specific to the apparatus of a second physical downlink shared channel in the downlink subframe.

In an additional exemplary embodiment, an apparatus includes one or more processor and one or more memories including computer program code. The one or more memories and the computer program code are configured to, with the one or more processors and in response to execution of the computer program code, cause the apparatus to perform at least the following: signaling a user equipment to indicate whether the user equipment is to access one or both of a first downlink control region in a downlink subframe or an enhanced downlink control region in the downlink subframe, wherein the downlink subframe has a downlink transmission bandwidth and a time duration; placing in the first downlink control region a common downlink control channel message corresponding to at least the user equipment; in response to the received signaling indicating the user equipment is to access the first downlink control region, placing in the first downlink control region a downlink control channel message corresponding to the user equipment and comprising quadruplets of contiguous subcarriers spread over a plurality of physical resource blocks spread over the whole downlink transmission bandwidth for the first downlink control region, each quadruplet occupying a portion but not all of a physical resource block, and depending on the downlink control channel message placing or not placing a portion specific to the user equipment of a first physical downlink shared channel in the downlink subframe; in response to the received signaling indicating the user equipment is to access the enhanced downlink control region, placing in the enhanced downlink control region a downlink control channel message corresponding to the user equipment and comprising a plurality of subcarriers occupying one or more physical resource blocks contiguous in one or both of time or frequency, and depending on the determined downlink control channel message, placing or not placing a portion specific to the user equipment of a second physical downlink shared channel in the downlink subframe; and transmitting the subframe.

In a further exemplary embodiment, a method includes the following: signaling a user equipment to indicate whether the user equipment is to access one or both of a first downlink control region in a downlink subframe or an enhanced downlink control region in the downlink subframe, wherein the downlink subframe has a downlink transmission bandwidth and a time duration; placing in the first downlink control region a common downlink control channel message corresponding to at least the user equipment; in response to the received signaling indicating the user equipment is to access the first downlink control region, placing in the first downlink control region a downlink control channel message corresponding to the user equipment and comprising quadruplets of contiguous subcarriers spread over a plurality of physical resource blocks spread over the whole downlink transmission bandwidth for the first downlink control region, each quadruplet occupying a portion but not all of a physical resource block, and depending on the downlink control channel message placing or not placing a portion specific to the user equipment of a first physical downlink shared channel in the downlink subframe; in response to the received signaling indicating the user equipment is to access the enhanced downlink control region, placing in the enhanced downlink control region a downlink control channel message corresponding to the user equipment and comprising a plurality of subcarriers occupying one or more physical resource blocks contiguous in one or both of time or frequency, and depending on the determined downlink control channel message, placing or not placing a portion specific to the user equipment of a second physical downlink shared channel in the downlink subframe; and transmitting the subframe.

In yet another embodiment, a computer program product is disclosed that comprises a computer-readable memory medium bearing computer program code embodied therein for use with a computer, the computer program code comprising: code for signaling a user equipment to indicate whether the user equipment is to access one or both of a first downlink control region in a downlink subframe or an enhanced downlink control region in the downlink subframe, wherein the downlink subframe has a downlink transmission bandwidth and a time duration; code for placing in the first downlink control region a common downlink control channel message corresponding to at least the user equipment; code for, in response to the received signaling indicating the user equipment is to access the first downlink control region, placing in the first downlink control region a downlink control channel message corresponding to the user equipment and comprising quadruplets of contiguous subcarriers spread over a plurality of physical resource blocks spread over the whole downlink transmission bandwidth for the first downlink control region, each quadruplet occupying a portion but not all of a physical resource block, and depending on the downlink control channel message placing or not placing a portion specific to the user equipment of a first physical downlink shared channel in the downlink subframe; code for, in response to the received signaling indicating the user equipment is to access the enhanced downlink control region, placing in the enhanced downlink control region a downlink control channel message corresponding to the user equipment and comprising a plurality of subcarriers occupying one or more physical resource blocks contiguous in one or both of time or frequency, and depending on the determined downlink control channel message, placing or not placing a portion specific to the user equipment of a second physical downlink shared channel in the downlink subframe; and transmitting the subframe.

DETAILED DESCRIPTION OF THE DRAWINGS

In a cellular radio system like 3GPP LTE, the base station (BS) (also known as eNode-B or eNB) signals the time-frequency resources allocated to a terminal (UE). In LTE, the downlink and uplink resources are allocated in terms of resource blocks (RB). The number of RBs available in a time slot depends on the bandwidth and varies from six to 100 corresponding to bandwidths of 1.25 and 20 MHz respectively.

It has been decided that LTE will use frequency selective scheduling in the downlink shared channel (the PDSCH) in order to allocate the best RBs for each terminal. This gives the best performance but is also the most expensive way of signaling.

Figure 2:
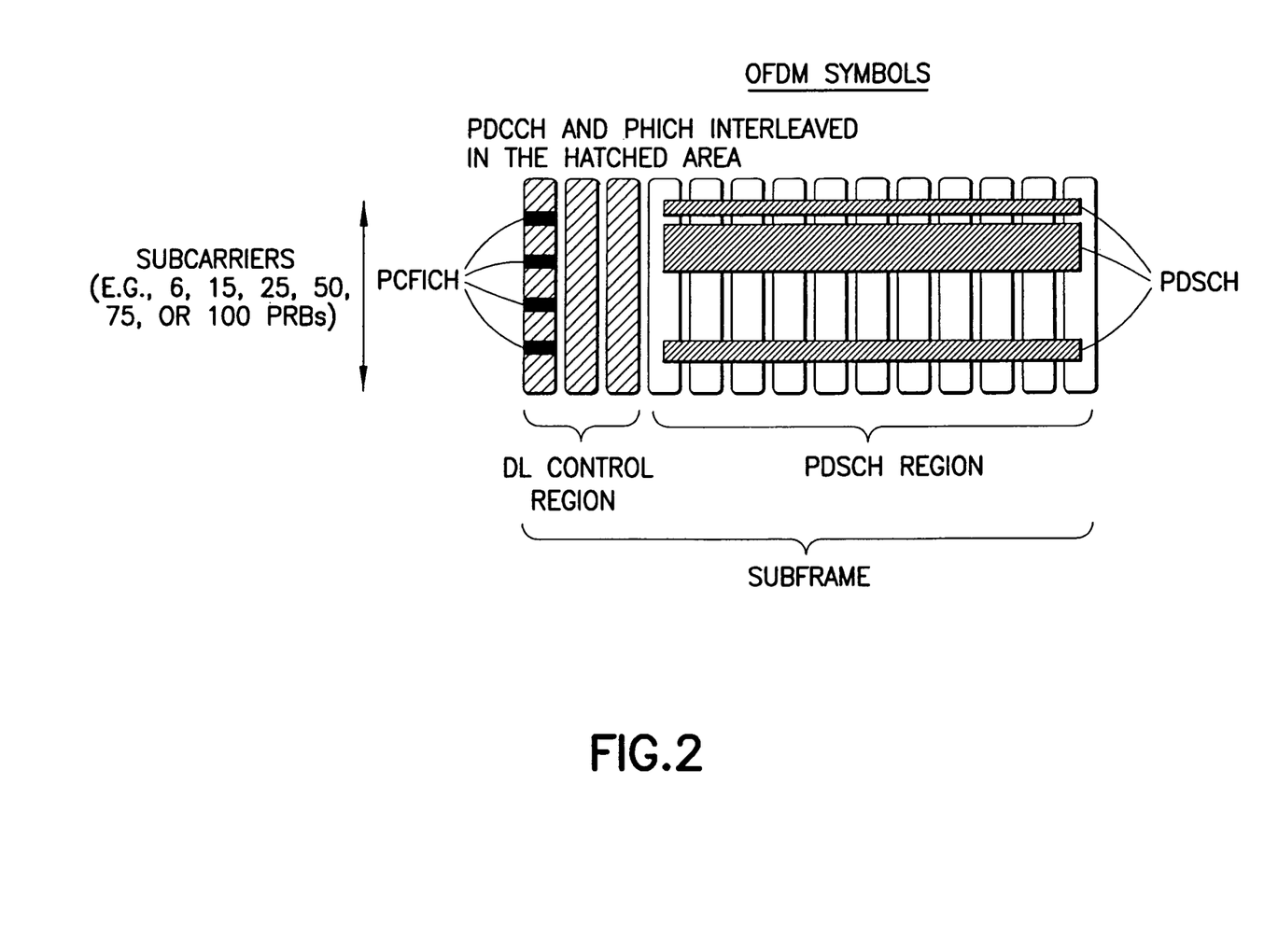
FIG. 2 shows a basic DL control channel structure as defined for a DL subframe in LTE Rel-8/9/10.

In LTE, the downlink control channel region, also shown in FIG. 2 as the DL control region, is transmitted in the first symbols of the subframe and the data channel (PDSCH) in the subsequent symbols as described in 3GPP TS 36.211, 3GPP TS 36.212, and 3GPP TS 36.213. There are three different channels involved in the DL control signaling:

1) PCFICH, which indicates the number of OFDM symbols for the DL control region (1-3 or 2-4 symbols for the smallest bandwidth). PCFICH is always transmitted in the first symbol of the subframe and is composed of 16 resource elements (RE), which are spread out in groups of four REs over the bandwidth (which includes multiple physical resource blocks, PRBs, of the first symbol).

2) PDCCH, which carries the DL control information (DCI). The PDCCHs are intended both for individual UEs as well as for common control for all UEs. PDCCHs are interleaved over the whole channel and over all indicated control symbols for maximum frequency diversity.

3) PHICH, which contains the acknowledgement signals (Ack/Nack) for the Hybrid-ARQ channel corresponding to uplink transmissions. Also the PHICH is interleaved with the other channels over all frequencies and control symbols.

FIG. 2 shows a basic DL control structure as defined for LTE Rel-8/9. LTE-Advanced Rel-10 has in addition defined cross-carrier scheduling, where the scheduling information of one carrier can be signaled on the control channel of another carrier. However, while the exemplary embodiments described herein also work for cross-carrier scheduling, the examples given herein do not make use of this property. Thus, for simplicity, the current control channel techniques are referred to herein as Rel-8/9/10. The instant exemplary embodiments propose some enhancements for future releases of the standard noted as Rel-11/12.

A problem is that the Rel-8/9/10 DL control channel is optimized for the case when the channel state information (CSI) of the UEs is unknown to the eNB. Therefore it has been observed by the inventors that both coverage- and capacity-wise the control channel performance could be improved if the channel state information could be utilized as is done in the shared data channel (PDSCH). In practice, this would mean that one could transmit the PDCCHs with a higher code rate or a lower aggregation (i.e., repetition) and the capacity of the control channel would increase.

Figure 3:
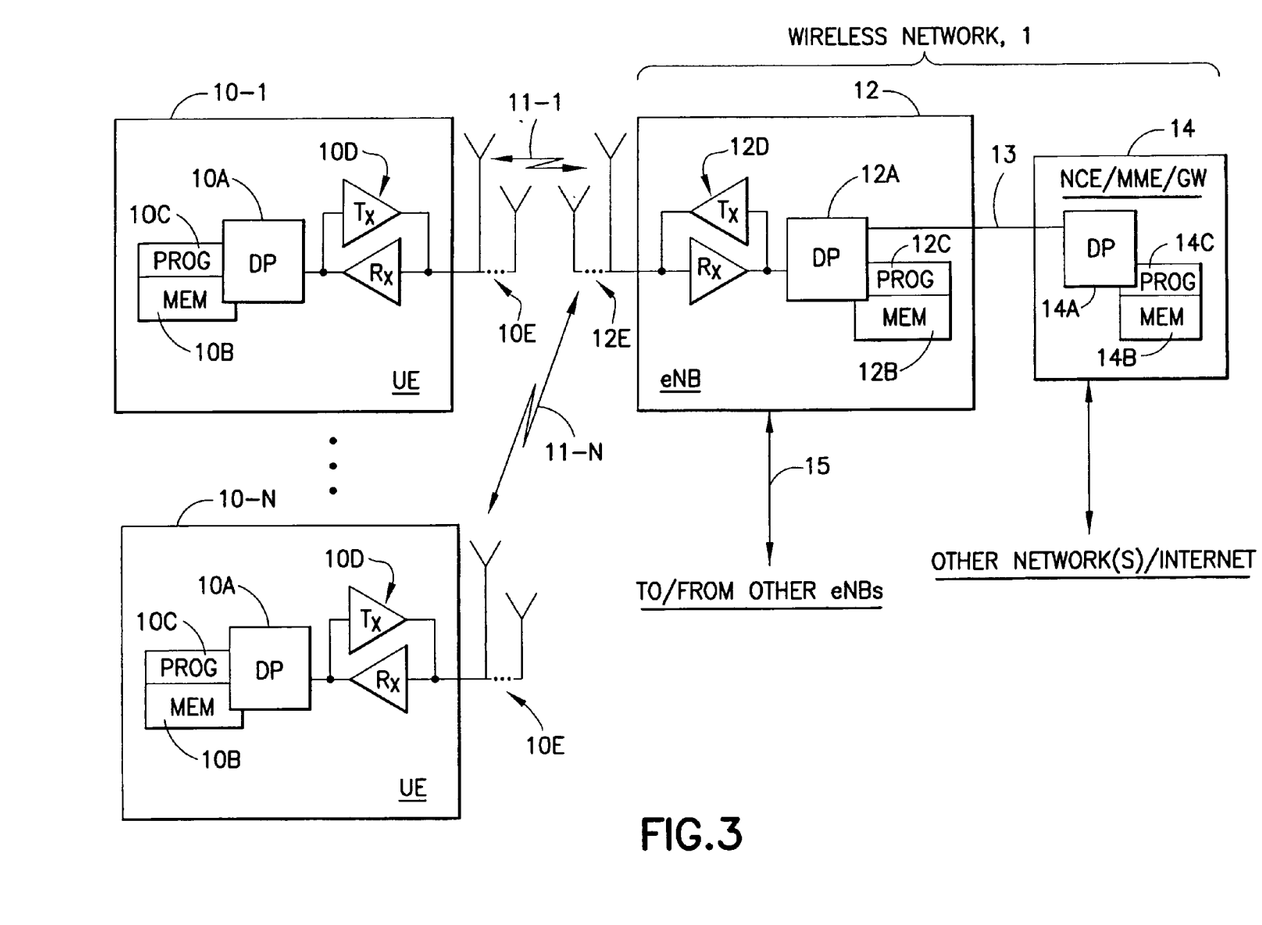
FIG. 3 shows a simplified block diagram of various electronic devices that are suitable for use in practicing the exemplary embodiments of this invention.

Before describing in further detail the exemplary embodiments of this invention, reference is made to FIG. 3 for illustrating a simplified block diagram of various electronic devices and apparatus that are suitable for use in practicing the exemplary embodiments of this invention. In FIG. 3, a wireless network 1 is adapted for communication over a wireless link 11 with apparatus, such as a mobile communication device which may be referred to as a UE 10, via a network access node, such as an eNB 12 for the case of an LTE or LTE-A network. Each of the UEs 10-1 through 10-N communicates using a wireless link 11-1 through 11-N, respectively, with the eNB 12. The wireless network 1 may include a network control element (NCE) 14 that may include the MME/SGW functionality shown in FIG. 1, and which provides connectivity with a further network, such as a telephone network and/or a data communications network (e.g., the Internet).

Each UE 10 includes a controller, such as a computer or a data processor (DP) 10A, a computer-readable memory medium embodied as a memory (MEM) 10B that stores a program of computer instructions (PROG) 10C, and at least one suitable radio frequency (RF) transceiver 10D for bidirectional wireless communications with the eNB 12 via one or more antennas 10E. The eNB 12 also includes a controller, such as a computer or a data processor (DP) 12A, a computer-readable memory medium embodied as a memory (MEM) 12B that stores a program of computer instructions (PROG) 12C, and at least one suitable RF transceiver 12D for communication with the UE 10 via one or more antennas 12E. The eNB 12 is coupled via a data/control path 13 to the NCE 14. The NCE 14 also includes a controller, such as a computer or a data processor (DP) 14A and a computer-readable memory medium embodied as a memory (MEM) 14B that stores a program of computer instructions (PROG) 14C. The NCE 14 may be connected to additional networks such as the Internet. The path 13 may be implemented as the S1 interface shown in FIG. 1. The eNB 12 may also be coupled to another eNB (or Node B) via data/control path 15, which may be implemented as the X2 interface shown in FIG. 1.

The techniques herein may be considered as being implemented solely as computer program code in the UE 10 or eNB 12 (e.g., as PROG 10C or 12C, respectively), or as a combination of computer program code (executed by one or more processors) and various hardware, including memory locations, data processors, buffers, interfaces and the like, or entirely in hardware (such as in a very large scale integrated circuit). Additionally, the transceivers 10D and 12D may also be implemented using any type of wireless communications interface suitable to the local technical environment, for example, they may be implemented using individual transmitters, receivers, transceivers or a combination of such components.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multi-core processor architecture, as non-limiting examples.

The inventors have noted that the current control structure is not optimal for performance enhancements and therefore it is proposed that immediately after the Rel-8/9/10 control channel, an enhancement part (as part of an enhanced control channel) could be transmitted in the next OFDM symbol(s). The enhanced control channel would only be used by future terminals and eNBs of the standard (Rel-10/11) and would not be noticed by older release UEs in the field. That is, backward compatibility is maintained.

The enhancement is based on the observation that if an eNB knows the channel state information for a UE, it is possible to optimize the control channel transmission. Beside others, two types of optimization might be considered here:

1) Localization in frequency of the PDCCH and selection of the best fitting RB for a particular UE based, on the available channel state information (similar to frequency-domain scheduling on the PDSCH); and 2) Precoding (e.g., beamforming) of the PDCCH in the UE specific search space in a multi-antenna system.

The former, i.e., (1), needs channel state information (CSI) in terms of channel quality information (e.g. SINR or SNR) of the different parts of the channel (e.g., in resolution of the resource element group) and the latter, i.e., (2), needs CSI in terms of spatial or directional channel information over the plurality of BS transmission antennas. Moreover, the enhanced PDCCH transmission in the UE specific search space enables also the possible usage of dedicated reference signal based PDCCH decoding at the UE without creating backward compatibility problems. With localization, the best frequency position for PDCCH is chosen in a similar manner as when the PDSCH is scheduled. This type of PDSCH scheduling is described in H. Holma, et al., Chapter 8, "Radio Resource Management", LTE for UMTS: OFDMA and SC-FDMA Based Radio Access (2009). With precoding, the best rank-1 performance can be achieved in a multi-antenna system. Precoding is especially convenient for localized transmissions, as the frequency response is similar for all REs and only one precoder is needed. That is, the localized transmissions use consecutive time-frequency resources. In other words, the transmissions should be in contiguous (in time or frequency or both) PRBs containing subcarriers for only a single UE. The existing Rel. 8/9/10 DL control channels assume the subcarriers used for transmission are spread across the whole bandwidth, whereas the contiguous PRBs only occupy some portion of the total downlink transmission bandwidth configured in the cell. In addition, it is easier to accommodate precoded reference symbols for easy demodulation at the receiver without the need for the UE to know which precoder is used by the eNodeB.

Figure 4:
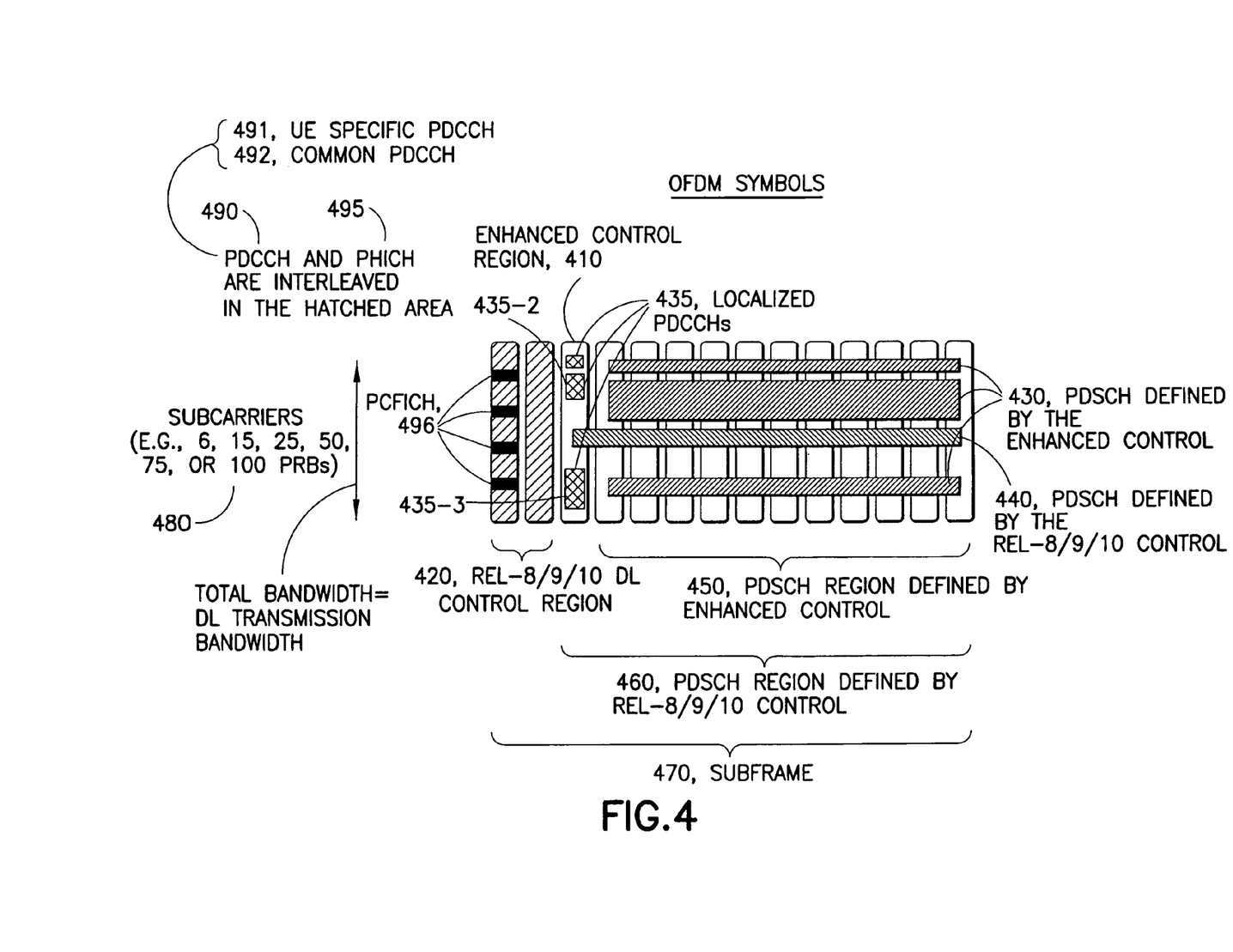
FIG. 4 shows a DL control channel structure as defined for a DL subframe in an exemplary embodiment.

An exemplary DL control channel structure is shown in FIG. 4 in. The DL subframe 470 in this example includes regions directed to Rel-8/9/10 control and related DL data transmission and regions directed to enhanced control and related DL data transmission. The regions directed to Rel-8/9/10 include the Rel-8/9/10 DL control channel region 420 and the Rel-8/9/10 PDSCH region 460 defined by Rel-8/9/10 control. The PDSCH examples 440 occupy the PDSCH region 460 corresponding to the Rel-8/9/10 control. That is, older release UEs access the Rel-8/9/10 DL control region 420 and the PDSCH 440 in the PDSCH region 460 defined by Rel-8/9/10 control. The older release UEs do not access the enhanced control region 410 (other than the portion carrying the PDSCH 440 part defined by Rel-8/9/10 control) and do not access the PDSCH 430 defined by enhanced control. It is noted that the locations of the exemplary PDSCH 430 and 440 positions are merely illustrative and are not limiting.

The regions directed to enhanced control include the enhanced control region 410 and the PDSCH 430 in the PDSCH region 450 defined by enhanced control. In an exemplary embodiment, a Rel-11/12 UE uses the Rel-8/9/10 control channel (i.e., Rel-8/9/10 DL control region 420) as default but can be configured to additionally use the enhanced control channel for the UE specific search space (SS). In an exemplary embodiment, these Rel-11/12 UEs access the Rel-8/9/10 DL control region 420, the enhanced control region 410 (other than that portion of the enhanced control region 410 occupied by the PDSCH 440 defined by Rel-8/9/10 control) and the PDSCH 430 defined by enhanced control of the PDSCH region 450 corresponding to enhanced control.

It is noted that the DL subframe 470 occupies in the time domain several OFDM symbols (of which there are 14 in this example). Thus, the DL subframe 470 has a time duration equivalent to the duration of 14 OFDM symbols in this example. Further, the DL subframe 470 occupies a number of subcarriers in the frequency domain. Twelve or optionally 24 subcarriers are used per PRB 480 and there may be, e.g., 6, 15, 25, 50, 75, or 100 PRBs 480 in the whole downlink transmission bandwidth for the case of 12 subcarriers per PRB. The hatched portions (in this example two OFDM symbols) of the subframe 400 denote the Rel-8/9/10 DL control region 420 and include the Rel. 8/9/10 PDCCH 490 (including UE specific Rel. 8/9/10 PDCCH 491 and common PDCCH 492), the PCFICH 496 and the PHICH 495.

Figure 5:
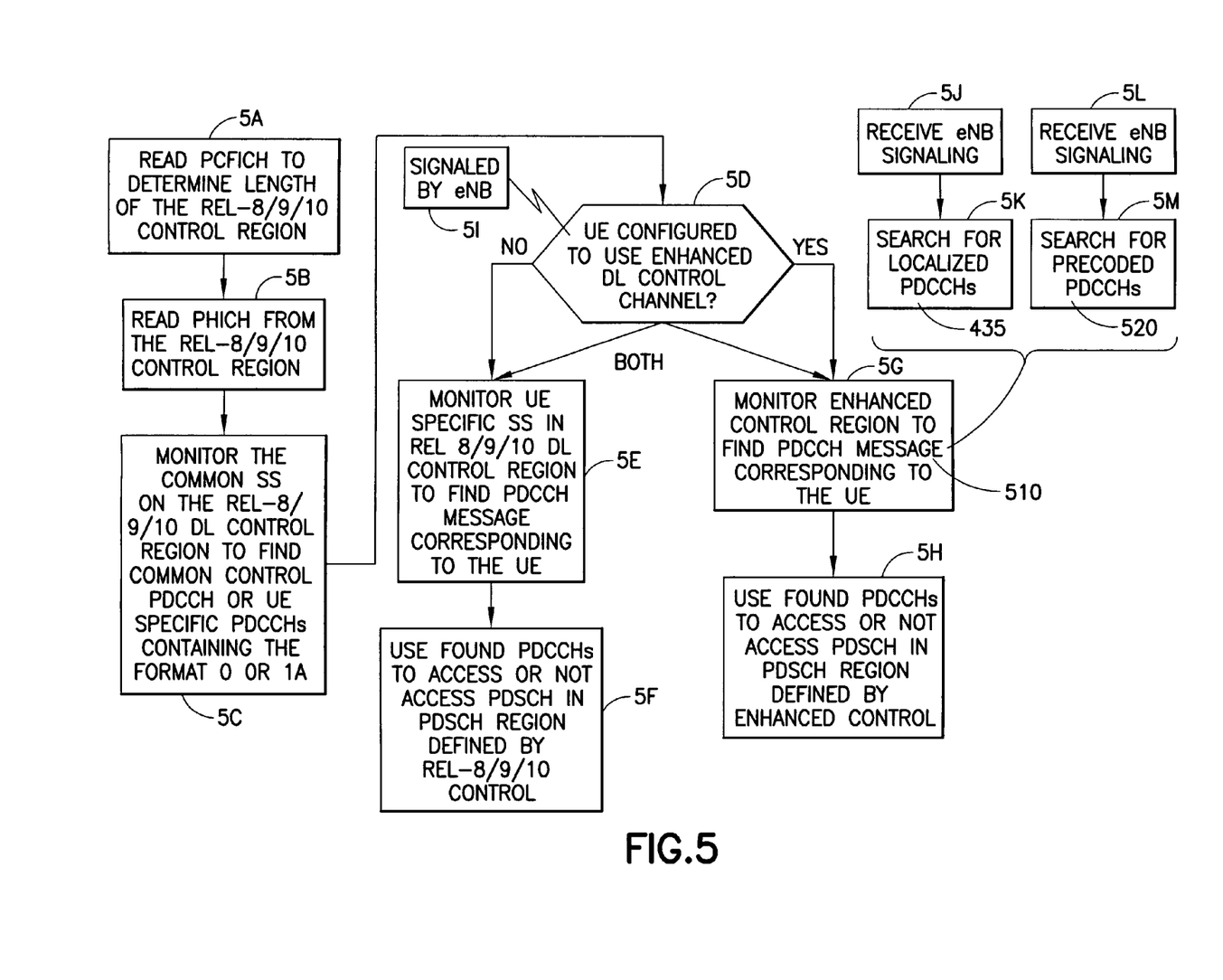
FIG. 5 is a flowchart of an exemplary method performed by a user equipment in accordance with an exemplary embodiment.

Exemplary UE behavior when reading the DL control channel structure is as follows (refer to FIG. 5 in addition to FIG. 4):

In block 5A, the UE reads the PCFICH 496 to find the length of the Rel-8/9/10 type control channel, which is shown in the example of FIG. 5 as the Rel-8/9/10 DL control region 420. In this example, the length of the Rel-8/9/10 DL control region 420 is two OFDM symbols in the time domain and in frequency domain the Rel-8/9/10 DL control region 420 includes the whole downlink transmission bandwidth. In block 5B, the UE reads the PHICH 495 from the Rel-8/9/10 type control channel (e.g., the Rel-8/9/10 DL control region 420). The PHICH 495 contains HARQ information not relevant to the instant disclosure.

In block 5C, the UE monitors the common SS on the Rel-8/9/10 type DL control region 420 in order to find the common PDCCH 492, which is recognized by having a CRC masked with SI-RNTI, RA-RNTI or P-RNTI or UE specific PDCCHs containing the format 0 or 1A as explained in 3GPP TS 36.213 Table 7.1-5.

Block 5D is not actually performed by older release or new UEs but is instead added to ease of exposition. That is, if a UE is an older release UE or is not configured to use the enhanced DL control channel (i.e., the accompanying enhanced control region 410) (block 5D=NO), blocks 5E and 5F are performed by the UE. By contrast, if the UE is configured, e.g., by signaling from the eNodeB (block 5I), to use the enhanced DL control channel (i.e., the DL control channel structure and the accompanying enhanced control region 410) (block 5D=YES), blocks 5G and 5H are performed by the UE. Alternatively, even though the UE has been signaled (block 5I) to monitor the enhanced control region (block 5D=YES), the UE could be requested to additionally try to decode the Rel-8/9/10 control region in blocks 5E and 5F.

If the UE is not configured to use the enhanced DL control channel (i.e., the accompanying enhanced control region 410) (block 5D=NO), in block 5E the UE monitors the UE specific SS (491) to find a PDCCH message corresponding to the UE (e.g., PDCCHs 491 masked with its own C-RNTI or SPS-RNTI). It is noted that the PDCCH message for a UE in the Rel-8/9/10 DL control region 420 includes quadruplets of contiguous subcarriers (that is, groups of four contiguous subcarriers) spread over a plurality of physical resource blocks spread over the whole downlink transmission bandwidth. In block 5F, the UE uses information from the found UE specific PDCCH message to access or not access the PDSCH 440 in the PDSCH region 460 defined by Rel-8/9/10 control. In block 5F, the UE therefore determines portions of the PDSCH region 460 that correspond to the UE and contain at least some UE-specific information. Based on the information from the found UE specific PDCCH messages UE also may not access the PDSCH region 460. That is, only if the PDCCH message contains a downlink assignment does the UE access the PDSCH region 460.

In block 5G, if the UE is configured to use the enhanced DL control channel (i.e., the accompanying enhanced control region 410) (block 5D=YES), the UE monitors the enhanced control region 410 to find the PDCCHs 510 (and their messages) corresponding to the UE (e.g., PDCCHs 510 masked with its own C-RNTI or SPS-RNTI). In one example, the PDCCHs 510 are the localized PDCCHs 435 found at a specific PRBs corresponding to the UE in the enhanced control region 410. Each localized PDCCH 430 contains a PDCCH message corresponding to a certain UE. In principle, the UE has to search for the localized PDCCH 435 in block 5K. However, the search can be restricted to a pre-determined search space (e.g., as signaled by the eNB in block 5J). In another example, the UE would find the PDCCHs 510 in the enhanced control region 410 that are precoded (e.g., beamformed) PDCCHs 520 and that correspond to the UE. In an example, the UE searches the UE-specific SS to find the precoded PDCCHs 520 (block 5M). The precoding information can be signaled (block 5L) to the UE either explicitly or by using precoded reference symbols. Alternatively, the UE may perform blind decoding or blind estimation of the precoder. The precoding may be precoding for transmit diversity, spatial multiplexing, beamforming, antenna selection, and any other suitable precoding.

Figure 10:
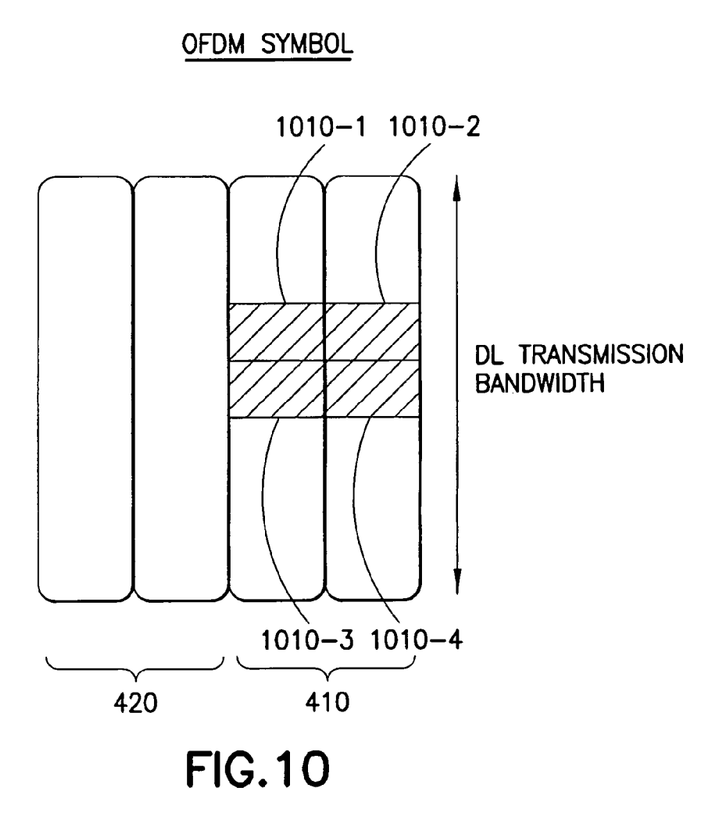
FIG. 10 shows an example of a portion of a subframe.

A PRB can only contain multiple PDCCHs in case several OFDM symbols are used for the enhanced control region (see FIG. 10). Further, a PDCCH message for a single UE would comprise, in an exemplary embodiment, portions or all of multiple contiguous PRBs in the enhanced control region 410. It is further noted that the localized PDCCH 435-3 is assigned more PRBs and therefore more subcarriers than is PDCCH 435-2. This is because there are different aggregations sizes (how many contiguous subcarriers are assigned to a UE) due to, e.g., how far a corresponding UE is from a base station (closer=fewer subcarriers and smaller aggregation size) or how much interference there is at the UE (more interference=more subcarriers and larger aggregation size). Note that when multiple PRBs are used for the PDCCH message, all of the subcarriers in the PRBs may be used, or only some of the subcarriers in the PRBs may be used. For instance, some subcarrier(s) in a PRB might contain, e.g., reference symbols while the other subcarriers contain the PDCCH message.

In block 5H, the UE uses information from the found PDCCHs 510 to access or not access the PDSCH 430 in PDSCH region 450 defined by enhanced control. In block 5H, the UE therefore determines portions of the PDSCH region 450 that correspond to the UE and contain at least some UE-specific information. Based on the information from the found UE specific PDCCH messages UE also may not access the PDSCH region 450. That is, only if the PDCCH message contains a downlink assignment does the UE access the PDSCH region 450.

In addition, as described above, advanced schemes could be envisioned, where the UE monitors the UE specific SSs on both the Rel-8/9/10 type control channel (e.g., Rel-8/9/10 DL control region 420) as well as on the enhanced control channel (e.g., enhanced control region 410). That is, the UE could perform the blocks of 5G and 5H and also blocks 5E and 5F (block 5D=BOTH).

Here it is assumed that there is a user specific SS defined in the enhanced control region 410 in a similar way as for the Rel-8/9/10 in order to let the UE know where to look for PDCCH candidates. In an exemplary embodiment, the SS is defined in UE specific way and would be designed to give a choice of starting points for PDCCH in different locations spread over the channel in order to select the best, or at least a reasonably good, channel state.

Figure 6:
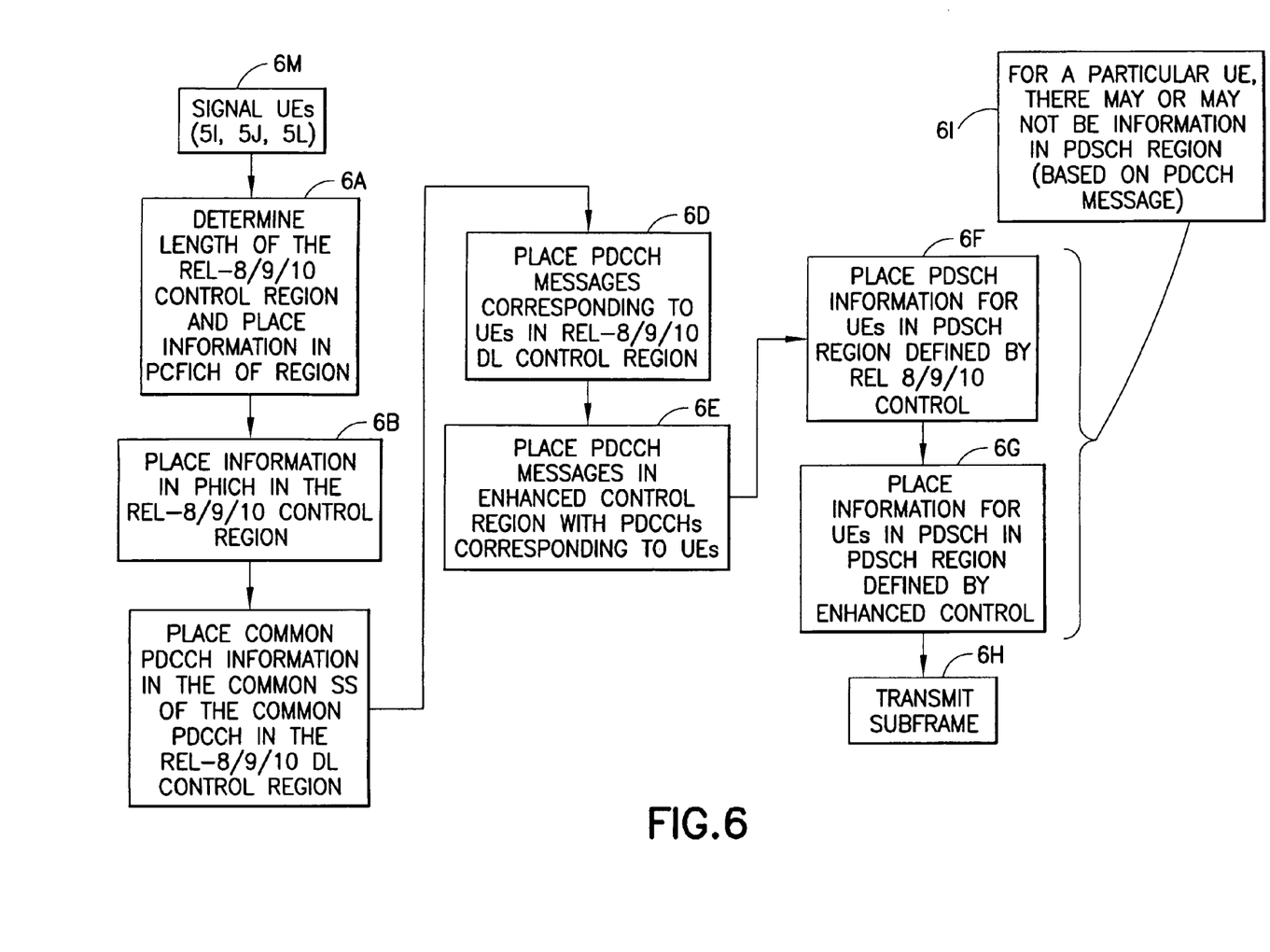
FIG. 6 is a flowchart of an exemplary method performed by a base station in accordance with an exemplary embodiment.

Turning to FIG. 6, a flowchart is shown of an exemplary method performed by a base station (e.g., eNB 12 of FIG. 3) in accordance with an exemplary embodiment. In block 6M, the base station signals the UEs, as described previously with respect to blocks 5I, 5J, and 5L. In block 6A, the base station determines the length of the Rel-8/9/10 control region (e.g., Rel-8/9/10 DL control region 420) and places information corresponding at least to the length of region 420 in the PCFICH 496 of the region 420. In block 6B, the base station places information in the PHICH 495 in the Rel-8/9/10 control region (e.g., Rel-8/9/10 DL control region 420). The PHICH 495 contains HARQ information not relevant to the instant disclosure.

In block 6C, the base station places common PDCCH information 492 in the common SS of the Rel-8/9/10 DL control region. As described above, both the older release UEs and the UEs able to use enhanced control read the common information on the common search space of the PDCCH 492. In block 6D, the base station places UE specific PDCCH information 491 (that is, a PDCCH message) on the UE specific search space of the Rel-8/9/10 DL control region 420. In block 6E, the base station places the localized, UE-specific enhanced PDCCH 435 (that is, a PDCCH message) in the enhanced control region 410. This is explained in more detail in reference to FIGS. 7 and 8.

In block 6F, the base station places PDSCH information 440 for UEs in the PDSCH region 460 that are using the Rel-8/9/10 PDCCH structure and are not configured to utilize the enhanced control channel structure. It is noted that the PDSCH 440 occupies a portion of the enhanced control region 410. In block 6G, the base station places PDSCH information 430 for UEs using the enhanced control in the PDSCH region 450 corresponding to enhanced control. As block 6I indicates, for both blocks 6F and 6G, for a particular UE, based on the corresponding PDCCH message for the UE in the Rel-8/9/10 DL control region 420 and/or the enhanced control region 410, there may or be information in the corresponding PDSCH region for this particular UE. In block 6H, the base station transmits the subframe.

Figure 7:
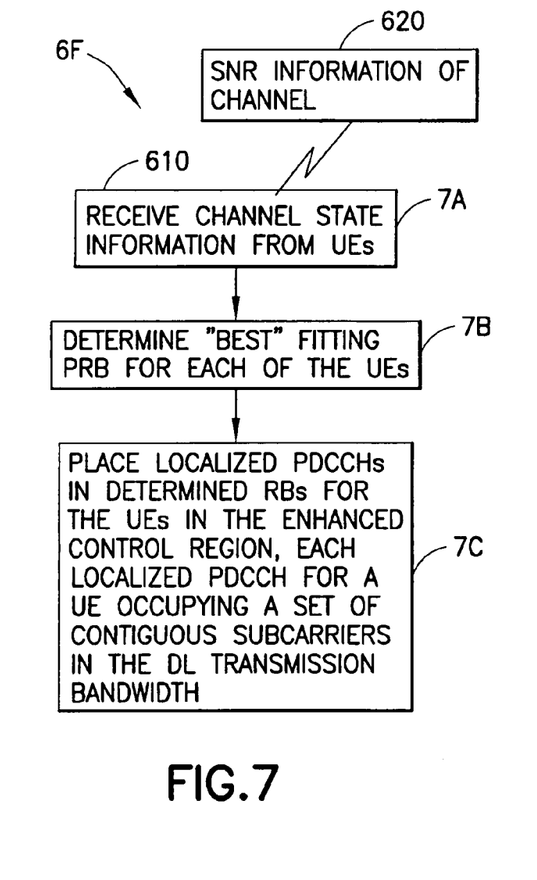
FIGS. 7 and 8 are flowcharts of exemplary methods of filling PDSCH region 450 corresponding to enhanced control with PDCCHs 430.

Turning to FIG. 7, a flowchart is shown of an exemplary method of placing the UE specific PDCCHs 435 in the enhanced control channel region 410. This method corresponds to block 6F of FIG. 6. In this example, the base station receives channel state information 610 from UEs in block 7A. The channel state information 610 in this example comprises SNR information 620 (e.g., or indicia thereof) of the channel from each UE. In block 7B, the base station uses the channel state information determines the "best" fitting PRB for each of the UEs. That is, a PRB selected as the best PRB for a particular UE would have the highest SNR corresponding to that PRB for that particular UE. It should be noted that the "best" fitting PRB may be the best PRB for two or more UEs. In this case, one of the UEs will be selected to have a PRB that is not the "best" PRB but is, e.g., the second-best PRB. In block 7C, the base station places localized PDCCHs 435 in determined RBs for the UEs in the enhanced control region 410. Each localized PDCCH for a specific UE occupies a set of contiguous subcarriers in the downlink transmission bandwidth for the enhanced control region 410.

Figure 8:
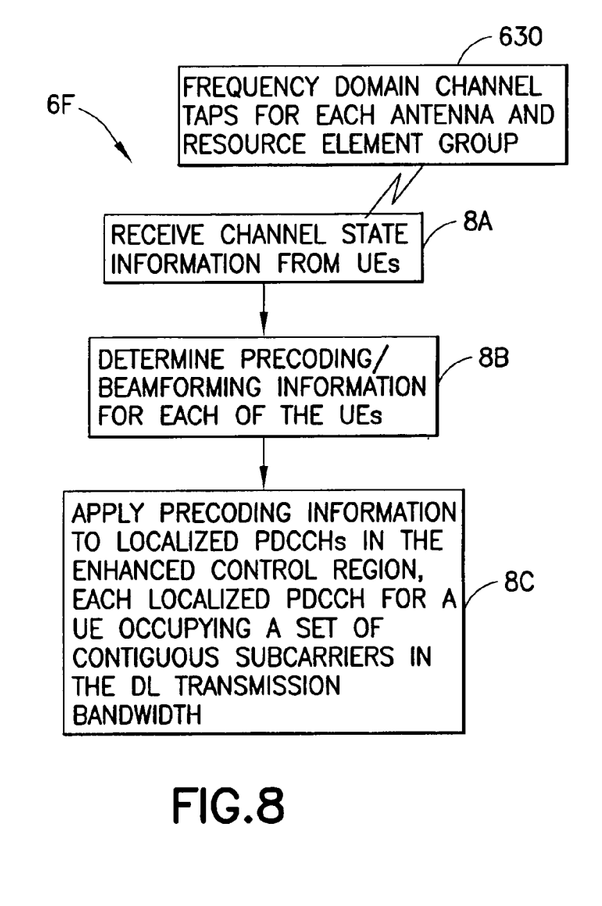

FIG. 8 shows another flowchart of an exemplary method of placing the UE specific PDCCHs 435 in the enhanced control channel region 410. This method corresponds to block 6F of FIG. 6. In block 8A, the base station receives channel state information 610 from the UEs. The channel state information in the example of FIG. 8 includes CSI in terms of spatial or directional channel information over the plurality of BS (base station, e.g., eNB) transmission antennas and resource element group (reference 630). It is noted that a "resource element group" is a set of four resource elements that are then used to carry a PDCCH message. A resource element is an OFDM symbol at a specific subcarrier. That is, a resource element group is a group of four contiguous subcarriers (a quadruplet) in one physical resource block. In block 8B, the base station determines precoding (e.g., beamforming) information for each of the UEs. For instance, a particular codebook might be chosen. In block 8C, the base station applies precoding (e.g., beamforming) information to localized PDCCHs 520 in the enhanced control region 410. Each localized PDCCH for a specific UE occupies a set of contiguous PRBs in the downlink transmission bandwidth for the enhanced control region 410.

Figure 9:
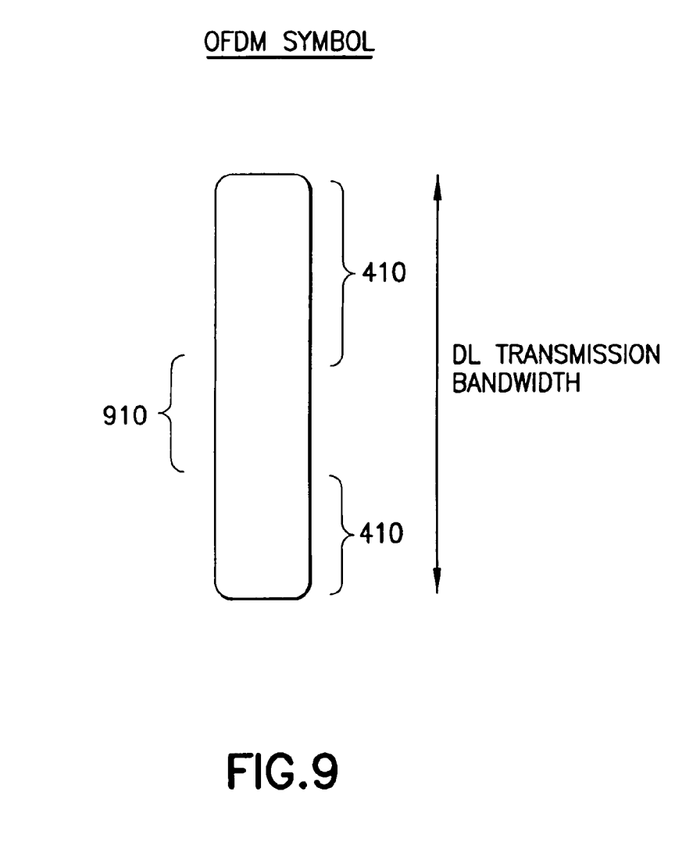
FIG. 9 is an example of an OFDM symbol having a portion for an enhanced control region.

Referring to FIG. 9, another exemplary embodiment is shown. This figure shows the third OFDM symbol from the subframe 470 of FIG. 4. In FIG. 4, this symbol contains all of the enhanced control region 410. In the example of FIG. 9, the enhanced control region 410 forms a consecutive or a non-consecutive subregion in frequency. The part of the symbol used as the enhanced control region is configured by higher layers on PRB basis. The portion 910 may be used, e.g. as part of PDSCH transmission. The size of the enhanced control region can be configured to in a cell specific way. That is, all the UEs in the cell would use the same configuration.

Turning now to FIG. 10, FIG. 10 shows an example of a portion of a subframe. The Rel-8/9/10 DL control region 420 and the enhanced control region 410 are shown. In this example, the enhanced control region 410 includes multiple OFDM symbols. A localized PDCCH 435, containing a PDCCH message, for a UE could include one or more of the PRBs 1010. That is, a PDCCH message for a UE could include multiple contiguous PRBs in time (e.g., 1010-1 and 1010-2; or 1010-3 and 1010-4) or multiple contiguous PRBs in frequency (e.g., 1010-1 and 1010-3; or 1010-2 and 1010-4), or multiple contiguous PRBs in both time and frequency (e.g., all four PRBs 1010-1 through 1010-4). It is noted that the number of subcarriers in each PRB is not limited to a quadruple and may be, e.g., five or more subcarriers in each PRB.

The techniques of enhancing the control channel have at least one or more of the following non-limiting benefits.

Higher capacity and better coverage of the DL control channel. This also means that there is a corresponding higher capacity of the data channel or alternatively better service.

Better suitability for frequency selective precoded transmission due to localized PDCCHs. Can accommodate different flavors of precoding like closed- or open-loop and basing the UE reception on cell specific reference signals; or UE-specific reference signals which enable direct PDCCH detection without precoder estimation or precoder signaling.

Very efficient for scheduling multiuser MIMO. The capacity of the DL control channel has been claimed to be insufficient when scheduling MU-MIMO. In regular MU-MIMO, two or several UEs with different precoding share the same allocation for the PDSCH and have PDCCHs on different control channel resources without precoding. With the techniques described herein, localized PDCCHs that schedule a MU-MIMO transmission can share the same REs and have different precoding (typically similar or the same precoding as for the shared channel). This is possible especially when the frequency resources of the PDCCH is a subset of those of the PDSCH and are included in the search spaces for the involved UEs.

No increase of the total DL control because the UE specific SS is moved to the enhanced channel for the Rel-11/12 UEs the Rel-8/9/10 control channel can be correspondingly decreased.

Backwards compatibility with UEs from earlier LTE releases.

It is noted that the UE specific SS in the enhanced control channel can overlap with the PDSCH of the Rel-8/9/10 UEs control channel. This is not a problem because the UE which tries to decode the PDCCH would only experience a failed CRC test and move on to the next PDCCH candidate in normal order.

The baseline is that the enhanced control region 410 is just one OFDM symbol but could potentially be set for some other number of symbols by configuration.

It is also noted that even if the eNB does not have the channel state information available, the eNB can always dynamically fallback and schedule the UE from the common SS or reconfigure the UE to use Rel-8/9/10 DL control channel.

One can envision several variants of this scheme like splitting the UE specific SS in two parts, where one part is on Rel-8/9 control channel and the other part is in the enhanced control channel.

Without in any way limiting the scope, interpretation, or application of the claims appearing below, a technical effect of one or more of the example embodiments disclosed herein is to provide an enhancement to the current DL control channel structure. Another technical effect of one or more of the example embodiments disclosed herein is to provide improved control for UEs.

Embodiments of the present invention may be implemented in software, hardware, application logic or a combination of software, hardware and application logic. In an exemplary embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with examples of computers described and depicted, e.g., in FIG. 3. The methods of FIGS. 5-8 may be performed via hardware elements, via software executing on a processor, or via combination of both. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims

What is claimed is:

1. An apparatus, comprising:
   at least one processor; and
   at least one memory including computer program code,
   the at least one memory and the computer program code configured to, with the at least one processor and in response to execution of the computer program code, cause the apparatus to perform at least the following:
   receiving signaling indicating whether the apparatus is to access one or both of a first downlink control region in a downlink subframe and an enhanced downlink control region in the downlink subframe, wherein the downlink subframe has a downlink transmission bandwidth and a time duration;
   accessing in the first downlink control region a common downlink control channel message;
   in response to the received signaling indicating the apparatus is to access the first downlink control region, accessing in the first downlink control region a downlink control channel message corresponding to the apparatus and comprising quadruplets of contiguous subcarriers spread over a plurality of physical resource blocks spread over the whole downlink transmission bandwidth for the first downlink control region, each quadruplet occupying a portion but not all of a physical resource block, and depending on the downlink control channel message accessing or not accessing a portion specific to the apparatus of a first physical downlink shared channel in the downlink subframe; and
   in response to the received signaling indicating the apparatus is to access the enhanced downlink control region, accessing in the enhanced downlink control region a downlink control channel message corresponding to the apparatus and comprising a plurality of subcarriers occupying one or more physical resource blocks contiguous in one or both of time and frequency, and depending on the determined downlink control channel message, accessing or not accessing a portion specific to the apparatus of a second physical downlink shared channel in the downlink subframe.

2. The apparatus of claim 1, wherein the downlink control channel message occupies at least two physical resource blocks contiguous in frequency.

3. The apparatus of claim 1, wherein the enhanced downlink control region occurs in time after the first downlink control region occurs in time in the downlink subframe.

4. The apparatus of claim 1, wherein the enhanced downlink control region does not occupy all of the downlink transmission bandwidth.

5. The apparatus of claim 1, wherein accessing in the enhanced downlink control region a downlink control channel message corresponding to the apparatus further comprises searching an apparatus specific search space in the enhanced downlink control region and decoding the downlink control channel message corresponding to the apparatus.

6. The apparatus of claim 1, wherein the received signaling indicates that the apparatus is to access both the first downlink control region and the enhanced control region.

7. The apparatus of claim 5, wherein decoding the downlink control channel corresponding to the apparatus further comprises using information regarding a precoding method used in an encoding process of the downlink control channel message corresponding to the apparatus in order to decode the downlink control channel message.

8. The apparatus of claim 7, wherein decoding the downlink control channel message corresponding to the apparatus further comprises utilizing one or more reference signals in the downlink control channel which are specific to the apparatus when decoding the downlink control channel message corresponding to the apparatus.

9. An apparatus, comprising:
   at least one processor; and
   at least one memory including computer program code,
   the at least one memory and the computer program code configured to, with the at least one processor and in response to execution of the computer program code, cause the apparatus to perform at least the following:
   signaling a user equipment to indicate whether the user equipment is to access one or both of a first downlink control region in a downlink subframe and an enhanced downlink control region in the downlink subframe, wherein the downlink subframe has a downlink transmission bandwidth and a time duration;
   placing in the first downlink control region a common downlink control channel message corresponding to at least the user equipment;
   in response to signaling indicating the user equipment is to access the first downlink control region, placing in the first downlink control region a downlink control channel message corresponding to the user equipment and comprising quadruplets of contiguous subcarriers spread over a plurality of physical resource blocks spread over the whole downlink transmission bandwidth for the first downlink control region, each quadruplet occupying a portion but not all of a physical resource block, and depending on the downlink control channel message placing or not placing a portion specific to the user equipment of a first physical downlink shared channel in the downlink subframe;
   in response to signaling indicating the user equipment is to access the enhanced downlink control region, placing in the enhanced downlink control region a downlink control channel message corresponding to the user equipment and comprising a plurality of subcarriers occupying one or more physical resource blocks contiguous in one or both of time and frequency, and depending on the determined downlink control channel message, placing or not placing a portion specific to the user equipment of a second physical downlink shared channel in the downlink subframe; and
   transmitting the subframe.

10. The apparatus of claim 9, wherein the enhanced downlink control region occurs in time after the first downlink control region occurs in time in the downlink subframe.

11. The apparatus of claim 9, wherein the enhanced downlink control region does not occupy all of the downlink transmission bandwidth.

12. The apparatus of claim 9, where a size of the bandwidth used for the enhanced downlink control region is configured specific to a cell in which the apparatus exists.

13. The apparatus of claim 9, wherein placing in the enhanced downlink control region a downlink control channel message corresponding to the user equipment further comprises:
   determining a precoding method and related precoding weights to apply to information in the downlink control channel message corresponding to the user equipment;

applying the determined precoding weights to the information to create precoded information; and placing the precoded information in the downlink control channel message corresponding to the user equipment.

14. The apparatus of claim 9, wherein the signaling indicates that the user equipment is to access both the first downlink control region and the enhanced control region.

15. The apparatus of claim 13, wherein placing in the enhanced downlink control region a downlink control channel message corresponding to the user equipment further comprises:

placing one or more reference signals specific to the user equipment in the downlink control channel message corresponding to the user equipment, where a same precoding method and precoding weights applied to the information are applied to the reference signals specific to the user equipment.

* * * * *